(12) United States Patent
Al Abed (10) Patent No.: US 12,087,156 B2
(45) Date of Patent: Sep. 10, 2024

(54) INTELLIGENT VEHICLE REGISTRATION PLATE

(71) Applicant: Maher Ibrahim Al Abed, Abu Dhabi (AE)

(72) Inventor: Maher Ibrahim Al Abed, Abu Dhabi (AE)

( * ) Notice: Subject to any disclaimer, the term of this patent is extended or adjusted under 35 U.S.C. 154(b) by 280 days.

(21) Appl. No.: 17/510,410

(22) Filed: Oct. 26, 2021

(65) Prior Publication Data
US 2022/0044550 A1 Feb. 10, 2022

Related U.S. Application Data

(63) Continuation-in-part of application No. 15/959,309, filed on Apr. 23, 2018, now abandoned.

(51) Int. Cl.
*G08G 1/017* (2006.01)
*B60R 13/10* (2006.01)
*G01D 21/02* (2006.01)
*G01S 19/01* (2010.01)

(52) U.S. Cl.
CPC .............. *G08G 1/017* (2013.01); *B60R 13/10* (2013.01); *G01D 21/02* (2013.01); *G01S 19/01* (2013.01)

(58) Field of Classification Search
CPC ................................ B60R 25/32; B60R 25/33
See application file for complete search history.

(56) References Cited

U.S. PATENT DOCUMENTS

| | | | | |
|---|---|---|---|---|
| 5,105,179 A | * | 4/1992 | Smith | B60Q 1/56 340/815.45 |
| 6,025,784 A | * | 2/2000 | Mish | G08G 1/017 343/866 |
| 6,448,889 B1 | * | 9/2002 | Hudson | G08G 1/017 342/51 |
| 7,525,433 B2 | * | 4/2009 | Tanaka | G06K 19/07749 340/572.1 |
| 10,056,681 B2 | * | 8/2018 | Schilling | H01Q 1/325 |
| 10,464,525 B2 | * | 11/2019 | Dubal | B60R 25/25 |
| 2002/0021210 A1 | * | 2/2002 | Naddeo | B60Q 1/56 340/425.5 |
| 2019/0188505 A1 | * | 6/2019 | Madkor | G08G 1/0141 |

* cited by examiner

*Primary Examiner* — Joshua T Kennedy
(74) *Attorney, Agent, or Firm* — Kevin J Fournier Intellectual Property Legal Services Ltd.; Kevin J Fournier (57) ABSTRACT

An intelligent vehicle registration plate mounted on a first vehicle comprises sensors, a non-transitory computer readable storage medium (NCRSM), and a processor. The sensors generate and transmit sensor data variables (SDV) based on detected parameters of a first vehicle. The data communications module (DCM) receives a request to locate a vehicle of interest. The analyzing module dynamically analyzes the SDV to identify a match between the first vehicle and the vehicle of interest and notifies the server based on the SDV exceeding a threshold. The DCM notifies the server of the location of the vehicle of interest. The system adds smart and secure functions for identification of registered vehicles, for example, early detection of severe accidents, detecting dangerous drifting on the streets, call and track feature, securing plate numbers from dismantling, applying basic analytics like number, type, and location of incidents within a certain period, etc.

18 Claims, 10 Drawing Sheets

INTELLIGENT VEHICLE REGISTRATION PLATE

CROSS-REFERENCE TO RELATED APPLICATIONS

This application claims the benefit of U.S. Non-provisional application Ser. No. 15/959,309 filed Apr. 23, 2018, by the present inventor; the disclosure is hereby incorporated herein by reference. This application constitutes a continuation-in-part of the prior application.

TECHNICAL FIELD OF THE INVENTION

The invention disclosed herein generally relates to vehicle safety systems. More particularly, the invention disclosed herein relates to an intelligent vehicle registration plate for providing a traceable and encrypted vehicle registration plate. Further, the intelligent vehicle registration plate allows a registration authority to determine reckless drivers, location of accidents, formulate quicker incident responses, track vehicles during emergencies, etc. The invention is based on retrofitting the traditional rare vehicle registration plate of the vehicles with an electronic device to assure turning the existing vehicle registration plate into a smart one with security and safety features. Utilizing the existing metallic vehicle registration plate has multiple reasons here and allowing all other traditional solutions for traffic management based on detecting or reading the metallic vehicle registration plate to function as is without disturbing its functionality is one of those reasons.

BACKGROUND

Existing conventional vehicle registration plate are usually metallic plates attached to vehicles to visually identify vehicles and consequently determine the details of the owners. Unfortunately, such vehicle registration plates are usually not secure as they can be swapped/changed/stolen easily and pose a high security risk for vehicle owners. Although, there are several anti-theft security alarms available in the market, such alarms can be effectively bypassed by a skilled individual. Moreover, there is no direct mechanism installed in current vehicles that enable authorities to detect major incidents and report it to registration entities in case of specific problems or accidents that could happen like severe accidents, for example, vehicle turn over, highway crashes, reckless driving, dangerous drifting on public streets, stolen vehicles having a dismantled registration plate, etc.

Even harmless events such as a worried parent who is not able to reach his/her child could be solved using an intelligent vehicle registration plate communicating with a central server or authority. A smart system, which allows a concerned authority to receive improved information about a vehicle or an emergency at a particular location thereby improving incident response, is therefore required. Moreover, existing digital vehicle registration plate require long wiring to reach the power source of the vehicle to operate. These devices raise an extra load on the power source of the vehicle and requires complex wiring from the registration plate to the power source of the vehicle. As such, existing devices fully depend on the power of the vehicle to run failing which the device completely shuts down. Further, existing devices using their own source of battery serve different purposes like presenting ads on a digital screen plate, or they show the current registration status whether it is expired or not and those serve a different purpose and implies a complete change of the current metallic plate number. Alternately, other systems require independent infrastructure related to network of communications, so each one serves a different and non-related purpose to what is presented by this invention. A smart system, which uses an independent source of power to operate, is required. Furthermore, a system, which requires no wiring and is installed as an enclosure that includes all required devices behind the rare metallic number to reduce complexity of installation, is required.

Hence, there is a long felt but unresolved need for a system, which allows a concerned authority to receive improved information about a vehicle or an emergency at a particular location thereby improving incident response. Additionally, there is a need for a system, which uses an independent source of power to operate. Furthermore, there is a need for a system, which requires no wiring and is installed as an enclosure that includes all required devices behind the rare metallic number to reduce complexity of installation. Additionally, it does not affect the running operation of other traditional systems that are based on current metallic plates like radar systems, red signal crossing cameras, visual identifications, etc.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The intelligent vehicle registration plate disclosed herein addresses the above-mentioned need for a system, which allows a concerned authority to receive improved information about a vehicle or an emergency at a particular location thereby improving incident response. Additionally, the invention addresses the need for a system, which uses an independent source of power to operate. Furthermore, the intelligent vehicle registration plate addresses the need for a system, which requires no wiring and is installed as an enclosure that includes all required devices behind the rare metallic number to reduce complexity of installation and to transform the current traditional metallic vehicle registration plate to an intelligent registration plate.

It is an object of the present invention to provide a solution that comprises a hardware in combination with firmware that will ensure smart and secure vehicle registration plate. Existing registration plates are usually metallic plates attached to vehicles to visually identify the vehicles and the details of the owners. Unfortunately, those plate numbers are usually not secure and can be swapped/changed/stolen for any security breach purpose. The main objective of intelligent vehicle registration plate is to detect issues and to have a fast incident response in addition to adding more intelligent, smart, and secure functions for identification of registered vehicle, for example, early detection of severe accidents "like the Turnover", detecting inappropriate way of driving "dangerous drifting on the streets", "call and track" feature involving calling a specific vehicle registration plate and tracking the related vehicle if required, securing vehicle registration plate from dismantling, applying basic analytics like number of incidents, type of incidents, and location of incidents within a certain period, etc.

The intelligent vehicle registration plate mounted on a first vehicle comprises a plurality of sensors, a non-transitory computer readable storage medium, and at least one processor. The sensors are configured to detect one or more parameters of the first vehicle. Further, the sensors are configured to generate and transmit sensor data variables based on the detected one or more parameters of the first vehicle. The non-transitory computer readable storage medium is configured to store a first data set comprising a unique identifier database verified by a server and a set of threshold sensor data variables associated with the first vehicle. The processor is communicatively coupled to the non-transitory computer readable storage medium and configured to execute a set of computer program instructions defined by modules of the intelligent vehicle registration plate. The modules of the intelligent vehicle registration plate comprise a data communications module and an analyzing module.

According to one embodiment, the intelligent vehicle registration plate of present invention is IoT powered device that apart from real time monitoring and notifying the central server about the incidents, keeps records of each incident within the memory unit of the device and sends it as a record to the server with the details of number of incidents, type of incident, location of incident, time of incident within certain period of time etc. The central server may specifically communicate with the intelligent vehicle registration plate of present invention and send a request/command for an analytic report of specific duration, whereas the analyzing module, depending on the command received from the central server, and based on the data stored within the memory unit of the intelligent vehicle registration plate, prepares an analytic report for an asked duration and sends it to the central server in real time.

According to one embodiment, the analyzing module configured within the processor also sends the analytic report of specific period to the central server after certain interval automatically without any request from the central server. The analytic report allows the central server to further analyze and detect the driving behavior of the driver and accordingly further notify the behavior report to the government management agency to take action accordingly.

The data communications module is configured to receive a request to locate a vehicle of interest from the server and the transmitted sensor data variables from the sensors, wherein the data communication module is GSM or LTE. The analyzing module is configured to dynamically analyze the received sensor data variables to identify a match between the first vehicle and the vehicle of interest. The analyzing module is further configured to notify the server based on the sensor data variables associated with the first vehicle exceeding the set of threshold sensor data variables. The data communications module is further configured to notify the server of the location of the vehicle of interest. Further, the server is configured to receive the sensor data variables exceeding the set of threshold sensor data variables and analyze the sensor data variables to evaluate the reason for such action and also to determine a course of action.

The intelligent vehicle registration plate further comprises an independent power source for supplying power to the intelligent vehicle registration plate. Additionally, it contains a power management module for optimizing power supply to the intelligent vehicle registration plate to ensure longer battery life and reduction in wastage of power. The intelligent vehicle registration plate draws power from the independent power source using a special matrix for power consumption which defines mode and contains pre-defined active time of operation of such modes like standby mode, normal mode, tracking mode or secure tracking mode of the system depending on the algorithm and analyzed sensory data.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
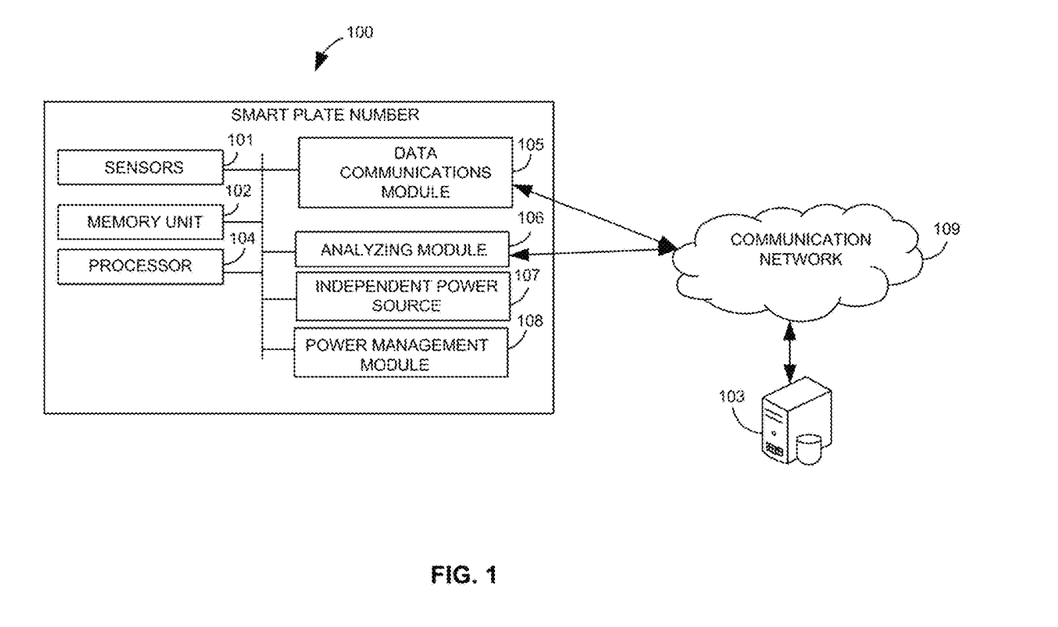
FIG. 1 exemplarily illustrates a schematic diagram of the intelligent vehicle registration plate.

FIG. 1 exemplarily illustrates a schematic diagram of an intelligent vehicle registration plate 100. The intelligent vehicle registration plate 100 comprises of an existing metallic vehicle registration plate fitted with a smart device having its own power source. Essentially, the invention is based of retrofitting an existing metallic vehicle registration plate with the smart device comprising processors and sensors to assure turning the existing vehicle registration plate into an intelligent one with security and safety features. Utilizing the existing metallic vehicle registration plate has a major reason here, which is allowing all other traditional solutions for traffic management based on detecting or reading the metallic registration plate to function as is without disturbing its functionality. A comprehensive electronic system is positioned inside an enclosure that has the exact dimensions of the current rare metallic registration plate, where the rare metallic plate number will be fitted on top of it to form the intelligent vehicle registration plate 100. In an embodiment, the enclosure size and fitting are customized based on the size of the rare metallic vehicle registration plate and based on the country of origin. The intelligent vehicle registration plate 100 is mounted on a first vehicle and comprises a plurality of sensors 101, a non-transitory computer readable storage medium (NCRSM) 102, and at least one processor 104. As used herein, the "non-transitory computer readable storage medium" refers to a memory unit 102 as exemplarily illustrated in FIG. 1.

The sensors 101 are configured to detect one or more parameters of the first vehicle. Further, the sensors 101 are configured to generate and transmit sensor data variables (SDV) based on the detected one or more parameters of the first vehicle. In an embodiment, the sensors 101 used are a combination of angular velocity sensors, motion sensors, accelerometers, gyrometers, etc. The sensors 101 detect one or more parameters, for example, motion, and an angular velocity of the first vehicle. In an embodiment, the memory unit 102 stores a first data set comprising a unique identifier database verified by a server 103 and a set of threshold sensor data variables associated with the first vehicle. The server 103 may be a central vehicle registration server 103 or merely an electronic device, such as a mobile device, a laptop, a personal computer, a tablet, etc. As used herein, "threshold sensor data variables" refer to predefined limits of sensor values that are set in the firmware to be within acceptable levels. Any sensor value exceeding the preset level is categorized as an event and triggers a notification at the server 103 or a designated electronic device. For instance, if a vehicle is stolen and the metallic vehicle registration plate has been dismantled, a notification is sent to the server 103.

The processor 104 is communicatively coupled to the memory unit 102 and configured to execute a set of computer program instructions defined by modules of the intelligent vehicle registration plate 100. The processor 104 refers to any one or more microprocessors, central processor (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 104 is implemented as a processor set comprising, for example, a programmed microprocessor and a math or graphics co-processor. The processor 104 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc.

The modules comprise a data communications module (DCM) 105 and an analyzing module 106. The data communications module (DCM) 105 is configured to receive a request to locate a vehicle of interest and receives the transmitted sensor data variables from the sensors 101. As used herein, a "vehicle of interest" may be a lost vehicle, a stolen vehicle, a vehicle driven by a reckless driver, a vehicle committing a traffic violation, etc. The vehicle of interest may also be a vehicle whose location must be traced in the case of an emergency. The communication module is selected, for example, from Simcom®, Huawei®, Sagemcom®, Telit®, Siemens®, Quectel®, etc. Also, the data communication is any of the LTE/GSM module that connects the intelligent vehicle registration plate with the centralized server over the network to transmit the sensory data and analyzed data from the smart registration plate to the centralized server, where to ensure the communication privacy, the communication between the centralized server and the intelligent vehicle registration plate as encrypted data to prevent data from eavesdropping, tampering, or forging during the communication process. Further, the data communication module allows server to call the vehicle registration plate to track its location by dialing the unique ID of said smart vehicle registration plate in cases of hit and run, in case of reported violation of traffic rules by any specific vehicle, in case of theft of vehicle or in case of hacked autonomous driving vehicle which is hacked/acquired by the hacker. According to one embodiment, since the smart vehicle registration plate is not communicatively or any way coupled with the principal electronic control unit or engine of any of autonomous or manned vehicle, it allows calling the smart registration plate to track the vehicle's location even if the vehicle is hacked and/or acquired by someone.

The especially programmed analyzing set of instructions or firmware hereinafter referred as an analyzing module 106 is configured or stored into the memory unit 102 communicatively coupled to the processor 104 to dynamically analyze the received sensor data variables to identify a match between the first vehicle and the vehicle of interest. The analyzing module 106 is further configured to notify the server 103 based on the sensor data variables associated with the first vehicle exceeding the set of threshold sensor data variables. The data communications module (DCM) 105 further configured to notify the server 103 of the location of the vehicle of interest. The server 103 is configured to receive the sensor data variables exceeding the set of threshold sensor data variables and analyze the sensor data variables to determine a course of action. The course of action may include alerting rescue personnel in the event of accidents, etc. According to one embodiment, the analyzing module 106 configured within the processor 104 of the smart vehicle registration plate 100 analyzes the collected real time sensory data being received from the sensors 101 to determine any abnormality in any of the sensory data or to monitor if any sensory data crossing the threshold limit, and predicts the reason of such event. Further, the analyzing module 106 of present smart registration plate 100 notifies the central server 103 of such events in real time with all the related sensory data and predicted reason for said event.

Figure 4A:
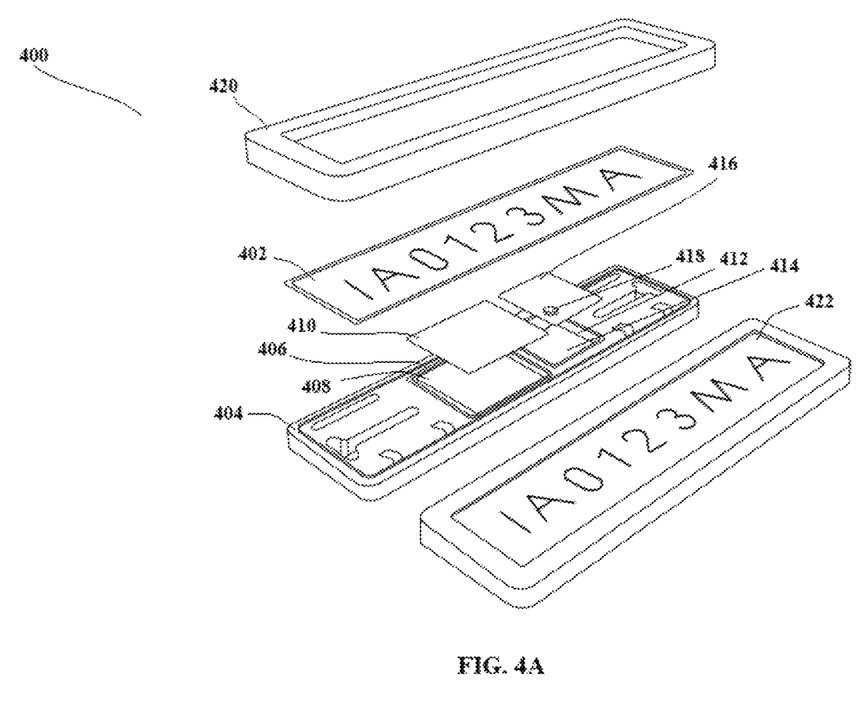
FIG. 4A shows one another embodiment of the intelligent vehicle registration plate with overall components and their placement.
Figure 4B:
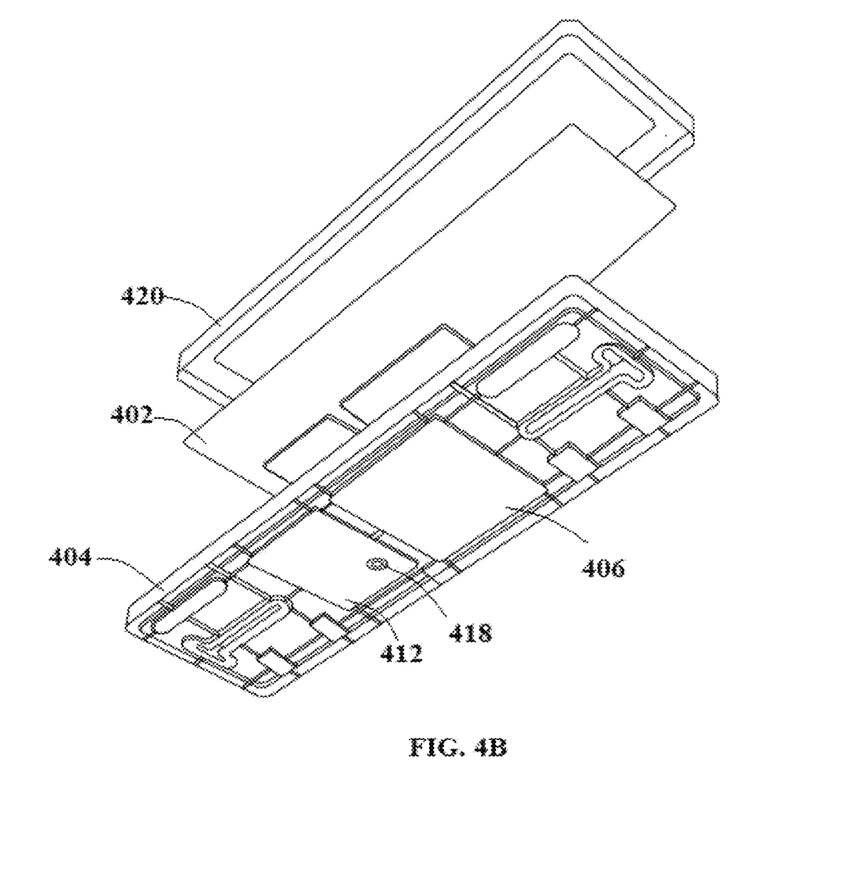
FIG. 4B shows bottom view of the same embodiment of the intelligent vehicle registration plate as shown in FIG. 4A.
Figure 4C:
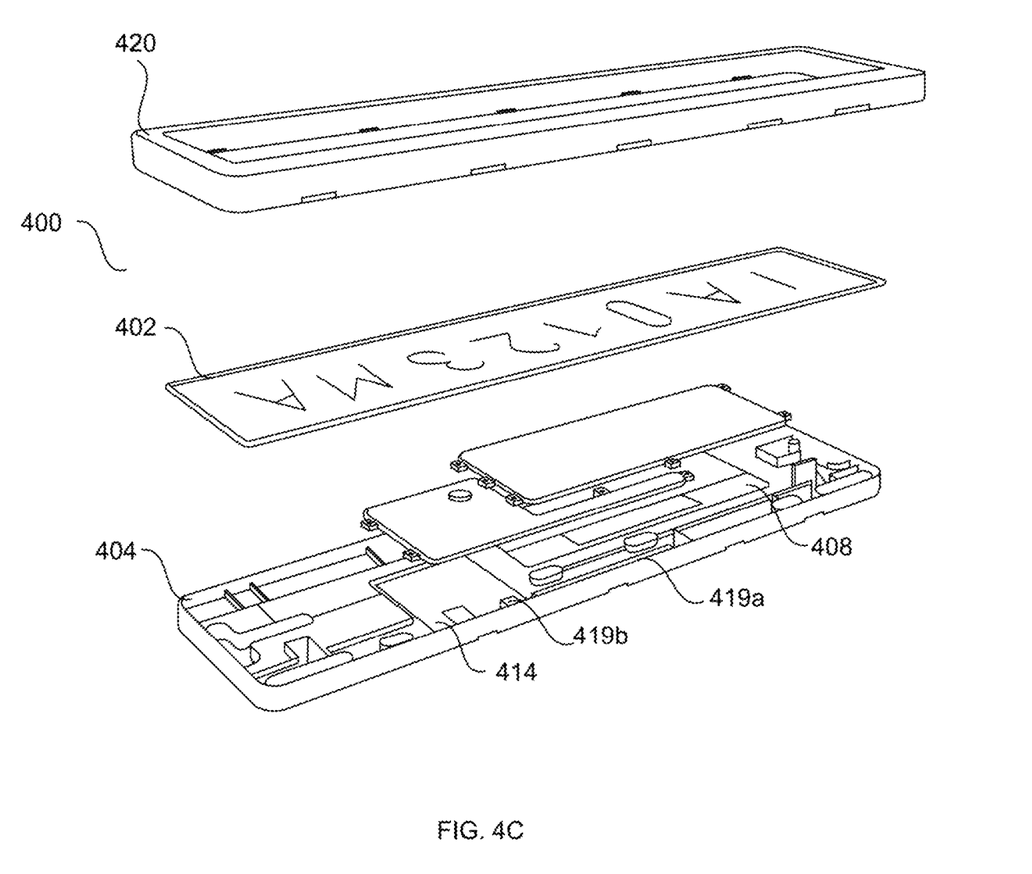
FIG. 4C shows one more view of the same embodiment of the intelligent vehicle registration plate as shown in FIG. 4A.
Figure 4D:
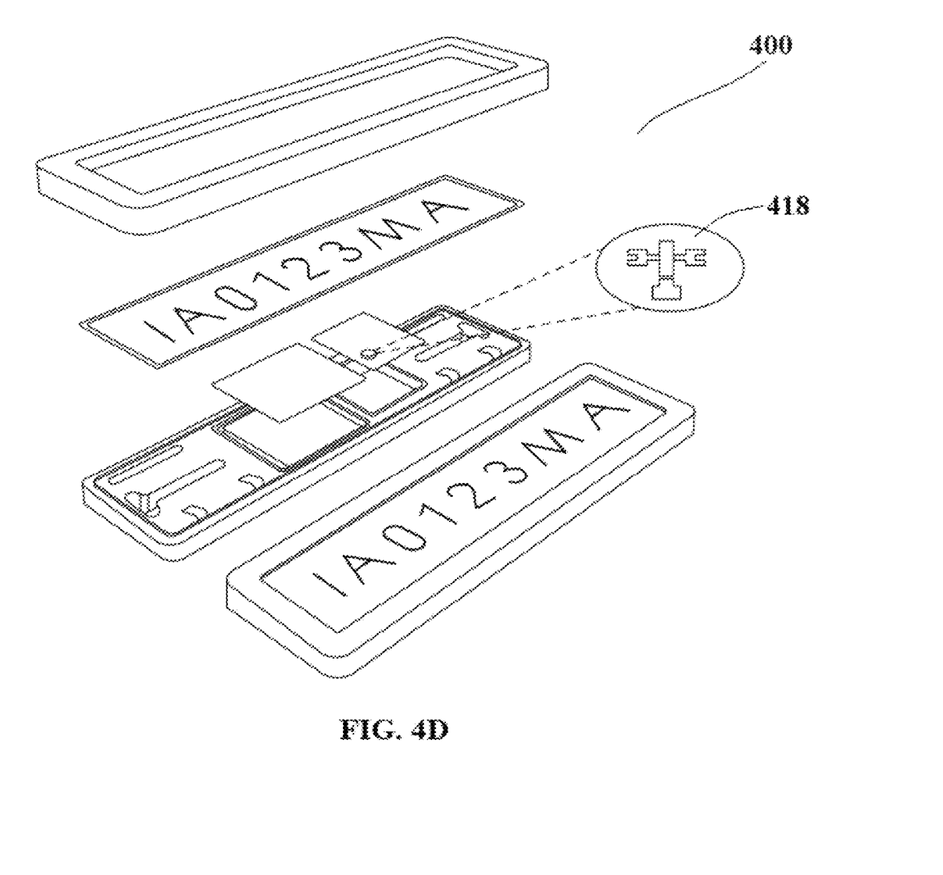
FIG. 4D shows one embodiment of the intelligent vehicle registration plate with zoomed in view of the grommet button.

According to one embodiment, the analyzing module, depending on the seriousness of events, automatically alerts the server which further communicates with the other connected security organizations with details of event and real time location of the vehicle for fast response from the security organizations. According to one embodiment, depending on the data received from plurality of sensors 101 embedded within the smart vehicle registration plate 101, the analyzing module detects events including, but not limited to, accidents of first vehicle, rollover, accidental drifting, drifting illegal donuts, plate removal, over speeding as well as real time battery status. According to one embodiment, the smart vehicle registration plate 100 of present invention is further capable to detect dismantling of the complete smart vehicle registration plate 100 as well as the metallic plate number from the smart device of the smart vehicle registration plate 100. According to one embodiment, the smart vehicle registration plate 100 is comprising of a plurality of push buttons [as shown in FIGS. 4A, 4B and 4C] wherein at least one is configured extending out of the back surface of the body of the smart vehicle registration plate 100 and at least one between the main body and the metallic plate during retrofitting; and change in positing any of said push button conveys the removal and/or damage to the smart vehicle registration plate 100. According to one embodiment, the analyzing module receiving signals from said plurality of push buttons, determines the reason for the event and notifies the same to the central server which further communicates with the respective authorized organization for instant action to prevent any serious damage of loss of life.

According to one embodiment, the intelligent vehicle registration plate 100 further comprises an independent power source 107 for supplying power to the intelligent vehicle registration plate 100. In an embodiment, a power management module 108 is utilized for optimizing power supply to the intelligent vehicle registration plate 100 to ensure longer battery life and reduction in wastage of power. The intelligent vehicle registration plate 100 may have additional power saving mode wherein the intelligent vehicle registration plate 100 draws power from the independent power source 107 using special matrix for power consumption based on operating modes such as the standby, the active, the tracking and the high secure tracking mode. Each such mode has predefined specific active time in matrix thus based on this matrix the system reduces power consumption and optimize the power for a long span.

According to one embodiment, the intelligent vehicle registration plate 100 further includes a vibration detection sensor which detects ON state and OFF state of an engine depending on which the processor automatically starts functioning of other components of the intelligent vehicle registration plate 100. According to one embodiment, when the engine of vehicle is OFF for a pre-defined amount of time, the intelligent vehicle registration plate 100 automatically goes into a stand-by mode under which the functioning of all the components are stopped. According to one embodiment, the intelligent vehicle registration plate wakes up periodically at identified periods depending on the mode of operation to monitor the real time condition of vehicle, to collect real time sensory data, to determine any event of emergency and to notify such event to the centralized server as well as to change the mode of operation depending on said data and determined event. According to one embodiment, the vibration sensor, in standby mode of the smart vehicle registration plate, when detects an engine ON, sends a signal to the processor of the intelligent vehicle registration plate to change the mode and start functioning of other components of the plate depending on the mode selected by the processor which prevents unnecessary battery consumption thus extending battery life.

According to one embodiment, the intelligent vehicle registration plate works in different modes which are automatically selected by the plate 100 itself. According to one embodiment, the intelligent vehicle registration plate works in four principle modes which includes a standby mode, normal mode, tracking mode and secure tracking mode. According to one embodiment, a separate status byte is defined by the processor for each mode of operation which allows the analyzing module to identify the present mode under which the intelligent vehicle registration plate is working and depending on the real time sensory data, the analyzing module changes the mode of operation and changes the status byte associated with said new mode of operation within the processor.

When the engine of vehicle is OFF or when the vehicle stands stationary for a pre-defined time period, the vibration sensor and motion detection sensor sends a negative signal to the processor which causes the analyzing module to put the intelligent vehicle registration plate into the standby mode and accordingly set the status byte associated with the standby mode within the processor. In standby mode, the processor puts all the components of the plate in sleep by commanding the battery management module to obstruct the power supply of said components and wakes the complete vehicle registration plate and its components at pre-defines interval of time to detect any change in vehicle state or any event and accordingly command the processor to automatically change the mode depending on the state and detected event.

According to one embodiment, when the user starts the engine of vehicle, the vibration sensor detects the engine ON state when it wakes up in periodic pre-defined time in standby mode and sends a signal to the analyzing module, which automatically changes the status byte associated with the Standby mode to the status byte of any other mode in the processor such as Normal mode, Tracking mode or Secured tracking mode. Further, when the motion sensor detects motion of the vehicle without engine ON, in case of pushing by the thief in attempt to steal the vehicle, the analyzing module determines the situation from the data received from the vibration sensor and the motion sensor, and notifies the central server of the situation along with the real time location of the vehicle.

According to one embodiment, when the analyzing module finds the signal from the vibration sensor and the motion sensor as normal, it shifts the vehicle registration plate into a Normal mode. Also, the analyzing module shifts the vehicle registration plate into a normal mode when received a command from the central server. In Normal mode, the system allows the sensors to wake up and collect data more frequently compared to the Standby mode thus changing the pre-defined working interval smart vehicle registration plate defined for the Normal mode.

According to one embodiment, the threshold limit of each sensory data variable is pre-programmed or preset within the analyzing module of the processor which continuously monitors the real time sensory data being received from the plurality of sensors in Normal mode and compares or analyzes said received sensory data to check any sensory data variable is crossing the preset threshold limit. In instances when the real time sensory data crosses the preset threshold limit, the analyzing module, using the smart algorithm, determines the probable reason for said event and automatically notifies the central server about the event in real time, where the event can be a vehicle turn over, highway crashes, reckless driving, dangerous drifting on public streets, over speeding, illegal donut drifting, stolen vehicles having a dismantled registration plate etc.

According to one embodiment, the analyzing module of present intelligent vehicle registration plate, when detects such event, automatically shifts the vehicle from the Normal mode to the Tracking mode and accordingly changes the status byte within the processor. In tracking mode, the processor commands the battery management module to allow functioning of all the components of the intelligent vehicle registration plate. Further, in tracking mode, the processor of the present intelligent vehicle registration plate starts functioning of all the sensors including GPS module and a communication module to send all the sensory information along with the real time location of the vehicle to the central server more frequently than the Normal mode which helps in taking necessary actions like sending police car, ambulance, or maybe a firefighting truck to the accident place to have as faster response as possible.

According to one embodiment, when the central server of a government agency requires a real time status, location, past history etc. of any vehicle due to an incident like a reported theft, for example, they contact the intelligent vehicle registration by dialing through a unique ID associated with said vehicle registration plate through the central server which communicatively connect the central server with the intelligent vehicle registration plate through the GSM/LTE module configured as a communication module within the plate which is called as "Call and Track" feature. When the vehicle receives a call from the central server, the analyzing module of the processor shifts the plate into a secure tracking mode by changing associated status byte within the processor, wherein the secure tracking mode facilitates the server to track the actual location of the vehicle. Further, in secure tracking mode, the plate provides real time location data as well as real time sensory data to the central server along with the past history of events to allow central server to locate the vehicle and determine the probable event or condition of the vehicle.

According to one embodiment, the processor of the intelligent vehicle registration plate further prepares the battery status report from the real time data received from the battery management module and sends it to the central server. In case the battery drains below one specified level because of any reason such as battery leakage and or damage, the intelligent vehicle registration plate communicates with the central server to notify the emergency of battery drainage in order to take necessary action to replace the drained battery.

According to one embodiment, the smart vehicle registration plate includes a battery management module which uses special matrix of power consumption which defines each modes and pre-defined active time of operation of the smart vehicle registration plate in each said mode, where said power matrix is shown as a table to make understanding easier The battery management module in communication with the analyzing module determines the mode of operation of the smart vehicle registration plate from the status byte and based on the pre-defined time of working of the components in each mode, sends/uploads the data over the central server. While working in Standby mode, the battery management module provides power to the components to function, collect and send data to the server once in every 20 minutes working for two seconds each time thus three times or six seconds of total working in an hour. This two seconds time is the standard time required to collect and analyze the collected data and alert the server in case of detection of any event.

According to one embodiment, when the vehicle starts, the analyzing module shifts said smart vehicle registration plate into the Normal mode from the Standby mode in which the battery management module allows the components to draw power once in every 5 minutes to store the collected data over the central server resulting in working of total 24 seconds in one hour. According to one embodiment, when the analyzing module detects any event such as traffic rule breach, accidents, rollover of the first vehicle, accidental drifting, drifting an illegal donuts, plate removal, over speeding of the first vehicle, battery leak, and/or attempt of theft of the first vehicle etc. by analyzing the real time sensory data and/or value crossing the default threshold limit configured within the processor, the analyzing module first notifies such event as an emergency alert to the central server and automatically shifts the smart vehicle registration plate into a tracking mode, wherein the battery management module allows working of all the components including LTE and GPS module to transmit the real time location, detected event, recorded sensory data and battery status report to the central server station once in every minute causing total 120 seconds of working in an hour. According to one embodiment, once the central server receives alert of such event, it further alerts the rescue personnel and organizations depending on the event.

| Sr. No. | Operating Mode | Active seconds in total 1 hour time | Active hours in total 1 Year time | Active hours in total 3 Year time |
|---|---|---|---|---|
| 1. | Standby (Data send at every 20 minutes) | 6 seconds (Send 3 times) | Approx. 15 Hours (Send 26,280 times) | Approx. 44 Hours (Send 78,840 times) |
| 2. | Normal (Data send at every 5 minutes) | 24 seconds (Send 12 times) | Approx. 59 Hours (Send 105,120 times) | Approx. 176 Hours (Send 315,360 times) |
| 3. | Tracking (Data send at every 1 minutes) (This will use rarely in some special case/incidence) | 120 seconds (Send 60 times) | Approx. 292 Hours (Send 525,600 times) | Approx. 872 Hours (Send 1,576,800 times) |
| 4. | Secure Tracking (Data send at every 10 Second) (This will use rarely in some special case/incidence) | 720 seconds (Send 360 times) | Approx. 1,752 Hours (Send 3,153,600 times) | Approx. 5,256 Hours (Send 9,460,800 times) |

According to one embodiment, the smart vehicle registration plate only requires two seconds to send the recorded data to the server thus to increase battery life and to prevent unnecessary battery drainage, all the components of the smart vehicle registration plate does not need to be working all the time, which is controlled by the battery management module. According to one embodiment, in each mode, the battery management module is programmed with a pre-defined active time, within which only, the components of the smart vehicle registration plate are supplied with the power for their functioning so that they may collect and send the collected data and/or analysis report by the analyzing module to the centralized server in real time.

According to one embodiment, the processor in communication with the LTE/GSM module of the smart vehicle registration plate is capable to receive command from the central server to shift the smart plate into a secure tracking mode in case of any emergency alert received from the analyzing module or when required to track the vehicle by calling the smart vehicle registration plate. According to one embodiment, in secure tracking mode, the smart vehicle registration plate sends data including real time location to the server once in every 10 seconds causing 360 times automatic data transmission to the central server in an hour. Also, in secure tracking mode, the processor communicatively coupled with the GSM/LTE module allows the central server or any other authorized agency to call the smart vehicle registration plate using its specific unique identifier to track the plate in real time. According to one embodiment, the analyzing module shifts the vehicle automatically into a secure tracking mode whenever receives a call or command of "call and track" from the central server or government authorities to establish continuous connection between the server and respective plate for real time monitoring and tracking.

The intelligent vehicle registration plate 100 can be programmed to initiate automatically only after a motion sensor 101 detects movement of the first vehicle. Moreover, the intelligent vehicle registration plate 100 can be programmed to shut down automatically or enter standby mode when the first vehicle is powered off for a preset time, for example, sixty seconds. This feature of the intelligent vehicle registration plate 100 allows power saving and reduces wastage of energy. In an embodiment, the intelligent vehicle registration plate 100 is powered by an independent power source 107. Thus, the intelligent vehicle registration plate 100 does not require complex and long wiring circuits for installation. This increases usability from the point of view of an unskilled individual. Furthermore, installation time and complexity are drastically reduced.

The data communications module (DCM) 105 receives a request to locate a vehicle of interest from either a central vehicle registration server 103, for example, a computer, a laptop, a mobile phone, etc. As used herein, the "server" is an electronic device, for example, a personal computer, a tablet computing device, a mobile computer, a mobile phone, a smartphone, a portable computing device, a laptop, a personal digital assistant, a wearable device such as a touch centric device, a workstation, a server, a client device, a portable electronic device, a network enabled computing device, an interactive network enabled communication device, etc. In an embodiment, the electronic device is a hybrid device that combines the functionality of multiple devices. In another embodiment, computing equipment, for example, one or more servers are associated with one or more online services. The vehicle to server to vehicle communication is typically achieved over a communications network 109.

The communication network 109 is a network, for example, a long-term evolution (LTE) mobile communication network, etc. Moreover, the existing metallic vehicle registration plate is retrofitted with hardware including an electronic circuit with low power and compact microcontrollers, accurate sensors 101 to detect location, movements, angular velocity etc., via LTE connection for fast & precise communication to transfer all the acquired data from sensors 101 to a designated control room. Furthermore, the intelligent vehicle registration plate 100 has several smart operating modes such as standby, active/normal, tracking and the high secure tracking mode which are configured in the firmware to optimize power consumption by its independent power source 107 that feeds the vehicle registration plate with power for around 3 years without charging. The enclosure of the intelligent vehicle registration plate 100 is all weather proof to protect all components within the intelligent vehicle registration plate from the harsh environmental conditions. Retrofitting current available vehicle registration plate with the intelligent vehicle registration plate 100 ensures a smart, secure, and intelligent vehicle registration plate that can identify breaches and early detection of severe accidents like "the turnover", detecting reckless drivers, for example, dangerous drifting on the streets, or any such incidents, along with the functionality and advantages of the traditional systems based on metal vehicle registration plate as optical character recognition or automatic number plate recognition, traffic management and control, etc. Further, the main system in the control room, for example, the server 103 calls a specific vehicle registration plate to track that specific vehicle in case of incident such as pursuing a vehicle in addition to the cases of other incidents such as turnover or plate dismantling where the intelligent registration plate first detects such event and then itself communicates to the server and inform such incidents along with its current location. Moreover, the intelligent vehicle registration plate 100 has its own battery source which can feed the vehicle registration plate with power for around 3 years without charging. Additionally, the enclosure of the intelligent vehicle registration plate 100 is all weather proof to protect all components within the vehicle registration plate from harsh environmental conditions.

In an embodiment of the present invention, the processor 104 collects all the generated data from sensors 101 based on pre-configured modes of operation in the embedded firmware and sends it to the software of the control room through the communication module (105) and a communication network (109) which is more preferably, but not limited to, a GSM/LTE, firmware will have multiple operation modes such as standby mode, normal mode, and secure tracking mode where each mode is configured to perform a certain task of collecting the incidents at specific periods and configured to optimize the power consumption of the installed battery within the Secure and intelligent vehicle registration plate 100. Finally, all the collected data is sent through LTE to the control room software and used to show alerts or notifications received from the hardware and will be used for improved incident response. In another embodiment, the present invention might have extra operation modes like tracking mode, which could help in building some statistics and analysis for some other features like the road congestions at a certain time and location, and the software can be equipped with analytics module to perform advanced analytics on the data collected from the hardware. The intelligent vehicle registration plate 100 can work completely in autonomous fashion, where there is no need for any wired connection with the vehicles' computers or power or internal systems. Another advantage of the present invention is that it can be turned in to a commercial solution and offered as an enterprise solution to all vehicle registration authorities across the world. Further, turning the traditional vehicle's registration plate into an intelligent, smart and secure vehicle registration plate implies working in a very small area at the back side of the registration plate number which adds another unique proposition and the overall solution can be considered as a unique idea in the world of internet-of-things (IoT) and digital transformation.

Figure 2:
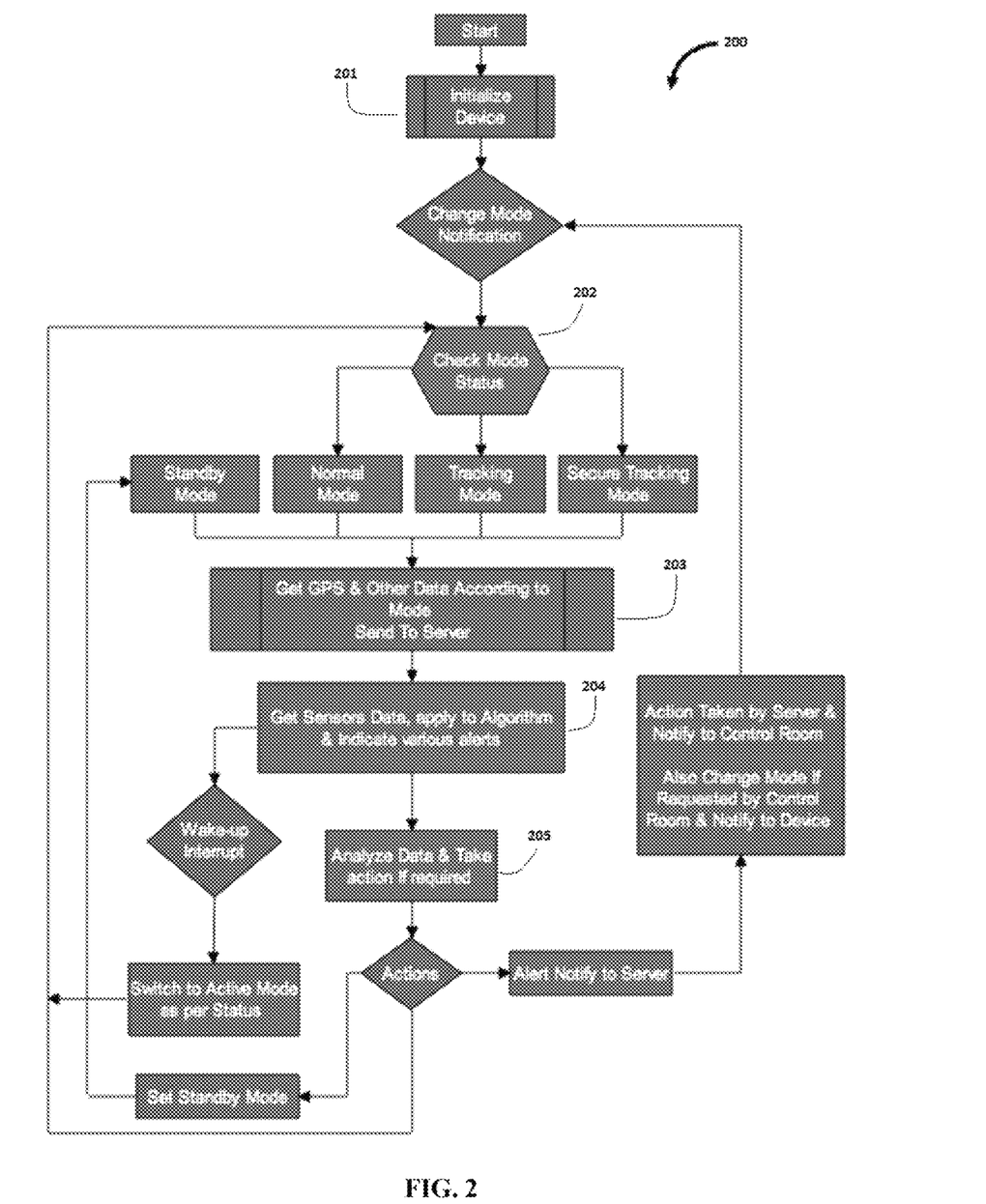
FIG. 2 exemplarily illustrates a flowchart showing different modes of operation of the intelligent vehicle registration plate.

FIG. 2 exemplarily illustrates a flowchart 200 showing different modes of operation of an intelligent vehicle registration plate 100. At step 201, the component of the intelligent vehicle registration plate 100 installed on the vehicle is initialized. During initialization, the GPIO (General Purpose Input Output) Pin, Clock and Timer, I2C peripherals, and the universal asynchronous receiver transmitter (UART), SPI, etc., are initialized. The device is configured with a unique ID. Further, all sensors, GSM, and GPS components are checked by taking dummy output. At step 202, the intelligent vehicle registration plate 100 checks the mode currently being operated. The mode change status byte is checked at step 202. As used herein, a "status byte" is a variable. Depending on these variable values we define any of the different modes (Standby/Normal/Tracking/Secure Tracking) as per current scenario. By default, the device works in the normal mode.

At step 203, the intelligent vehicle registration plate 100 gets GPS data and other data, for example, data frame, data from sensors, etc., and sends them to the remote server depending on mode of operation selected. At step 204, the intelligent vehicle registration plate 100 gets sensor data variables from the sensors and applies algorithms to determine if the variables are within preset threshold values. If the sensor data variables are above acceptable limits, the intelligent vehicle registration plate 100 determines the relevant action to be taken or notifications to be sent to the server in step 205. At step 205, the data from sensors is analyzed and processed by applying algorithms on them by the server to determine a course of action, wherein the course of action includes alerting the rescue personnel or agencies in case of accident, rash driving, illegal act etc.; alerting family members in case of rash driving, vehicle theft or accident of the first vehicle. Depending on the algorithm, the device will decide whether to go in standby mode or continue in a current mode. Depending on the analyzed data, the intelligent vehicle registration plate 100 sends a vehicle registration plate removal notification, a drifting notification, an accident notification, etc., to the server. The standby mode is activated, when the sensor detects the vehicle is at a fixed location for some time. The normal mode is activated when the sensor generates a wake-up signal device or when the server sends a notification. When an event such as an accident, reckless driving, of the first vehicles, etc., is detected or a request is received from the server, the tracking mode is activated. When the server sends notification, the device goes into secure tracking mode.

Figure 3:
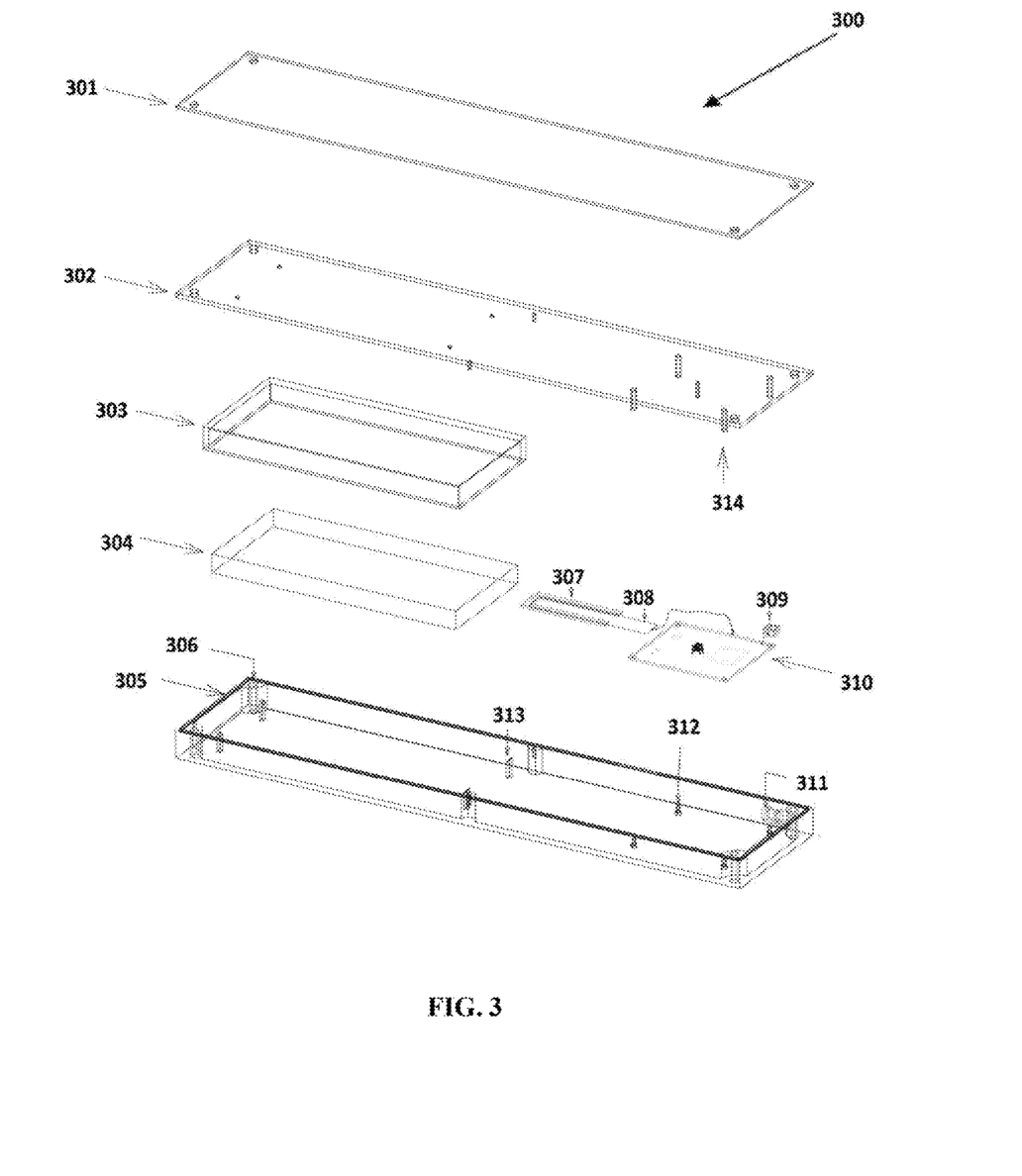
FIG. 3 shows an exploded view of one exemplary embodiment of the intelligent vehicle registration plate with overall components with their placement.

FIG. 3 shows an exploded view of one exemplary embodiment of the intelligent vehicle registration plate with overall components and their placement. It shows a traditional rare metal vehicle registration plate 301, a top cover 302 that connects enclosure to the metallic vehicle registration plate 301, a battery cover 303 to enclose and protect battery/independent power source 304 from harsh conditions addition to the other electrical components from being affected in case of leakage in battery/independent power source 304, a base plate 305 with rubber gasket to enclose all the components at its inside portion, screw holes 306 is provided to screw and hold rare metallic vehicle registration plate 301 with top cover 302 and base plate 305 forming whole enclosure of the intelligent vehicle registration plate to enclose all the components except metallic vehicle registration plate 301 that is placed on the top of the enclosure, a fixture 307 for the LTE antenna 308 of communication module 105, GPS antenna 309 with housing 311 to provide location of the said intelligent vehicle registration plate, a circuit board 310 which holds and connects together Processor, memory unit, communication module, analyzing module, sensors etc., a bottom fitting stud 312 and a top fitting stud 314 for circuit board and a holding stud for battery and its cover 313. This is just one exemplary embodiment out of many possible combination of laying out different units and system in accordance with one or more embodiments of the present invention.

FIG. 4A shows exploded view of one another embodiment of the smart vehicle registration plate. According to present embodiment, the smart vehicle registration plate is formed by configuring a traditional vehicle registration plate 402 over the smart electronic system which is configured within the main enclosure body 404 made of any rigid material such as, but not limited to, plastic, rubber, light metal or alloy of metal etc. According to one embodiment, the main enclosure body 404 includes plurality of smaller shaped enclosure compartments for placement of various electronic components of present smart electronic system. The main enclosure body 404, according to present embodiment, further includes a top cover 420 to secure the traditional metal registration plate 402 over the main enclosure body 404 to form the complete smart vehicle registration plate 422.

According to one embodiment, the smart vehicle registration plate 400 further includes a tactile switch 418 which is a grommet style rubber button coupled with the processor of the registration plate and configured within the main enclosure body 404 such that it may extend out of the bottom surface of the smart vehicle registration plate 400. According to one embodiment, when the smart vehicle registration plate 400 is mounted over the vehicle, the tactile switch 418 gets pushed because of the body surface of the vehicle, but in case the smart vehicle plate is dismantled from the vehicle for any reason such as for theft, by accident or by any other reason, the tactile switch 418 pulls back into the normal position sending an alert signal to the processor for an event which further notifies the same to the central server station.

According to one embodiment, the main enclosure body 404 of present smart vehicle registration plate includes a battery module enclosure chamber 406 with a cover 410 to enclose the battery module 408 to protect it and to avoid damage of any other electronic component even if battery 408 leaks. According to one embodiment, the battery module enclosure chamber 406 may further includes a gasket at the corner border where the cover 410 gets configured to properly seal the chamber 406 hence to avoid leakage of any liquid in case of battery damage.

According to one embodiment, the battery of the present smart vehicle registration is made of a plurality of battery modules arranged in a single row of two rows forming rectangle or square respectively. According to one embodiment, the arrangement of battery module allows customization of battery depending on the type and/or size of the vehicle registration plate and the enclosure module. Further, the customization of the battery module facilitates with longer life of the battery as well as easy enclosing within the enclosure of the smart vehicle registration plate.

According to present embodiment, the main enclosure body 404 includes a separate chamber 412 for the electronic unit 414 for placement of an electronic circuit having all the other electronic components including a processor, plurality of sensors, communication module, GPS module and other circuit elements communicatively coupled with the processor. According to present embodiment, the main enclosing body 404 further includes a cover member 416 to enclose said electronic unit chamber 412. FIG. 4B shows a back view of the embodiment of the smart vehicle registration plate 400 as disclosed in FIG. 4A, wherein the present embodiment further includes plurality of a grommet style rubber button 418, where at least one of the plurality of the rubber button 418 extends out from the bottom surface of the main enclosure body 404 which stays in pressed position when the enclosure body is configured over the vehicle and change in state of said button denotes dismantling or damage to the entire smart vehicle registration plate.

According to one embodiment, the smart vehicle registration plate of present invention further includes at least one grommet style rubber button 418 above the electronic unit chamber 412 that sets between the enclosure and the metallic registration plate and gets pressed/pushed inside when the plate is configured over the enclosure body. If, for any reason, the metallic plate gets removed or dismantled, the rubber button 418 gets pulled back resulting the processor of the smart vehicle registration plate to send alert signal of dismantling or damage of the plate to the central server. Further, the grommet button 418 gets configured at the bottom surface of the enclosure body gets pushed inside because of the vehicle surface when complete embodiment of the smart vehicle registration plate 422 is installed over the vehicle and pull back out automatically when it is dismantled from the vehicle because of any reason such as accident, attempt to theft, removal by any user etc. According to one embodiment, the grommet style rubber button 418 is communicatively coupled with the processor which monitors the real time condition of said button 418 to identify such events and accordingly notify the central server station.

FIG. 4C shows one more view of the same embodiment of the intelligent vehicle registration plate as shown in FIG. 4A. According to an embodiment, the intelligent vehicle registration plate 400 comprises a separate LTE antenna 419a and GPS antenna 419b coupled near the edge of the main frame for better signal receiving. The LTE antenna 419a is configured to allow calling the intelligent vehicle registration to track, while the GPS antenna is configured to monitor and transmit real time location to the server when requested. According to present embodiment, the placement of the antennas 419a and 419b insures the better signal receiving. FIG. 4C shows a zoomed in view of the grommet style rubber button 418 configured with the electronic unit extending out of the cover 416.

Figure 5A:
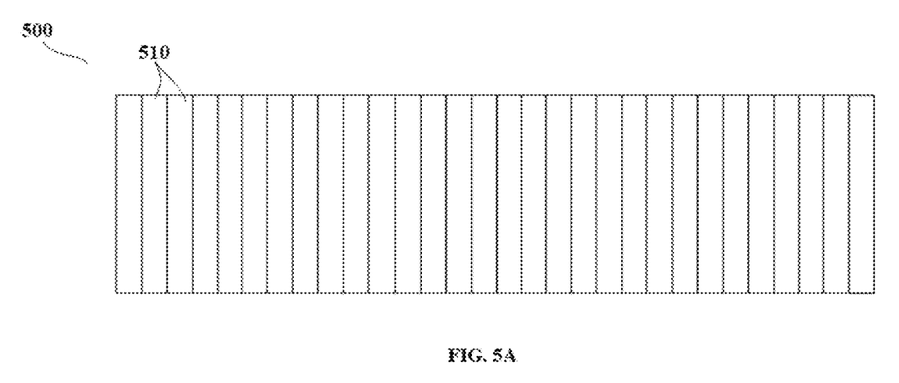
FIG. 5A shows one rectangular embodiment of a battery unit made by arranging plurality of battery module in a row.
Figure 5B:
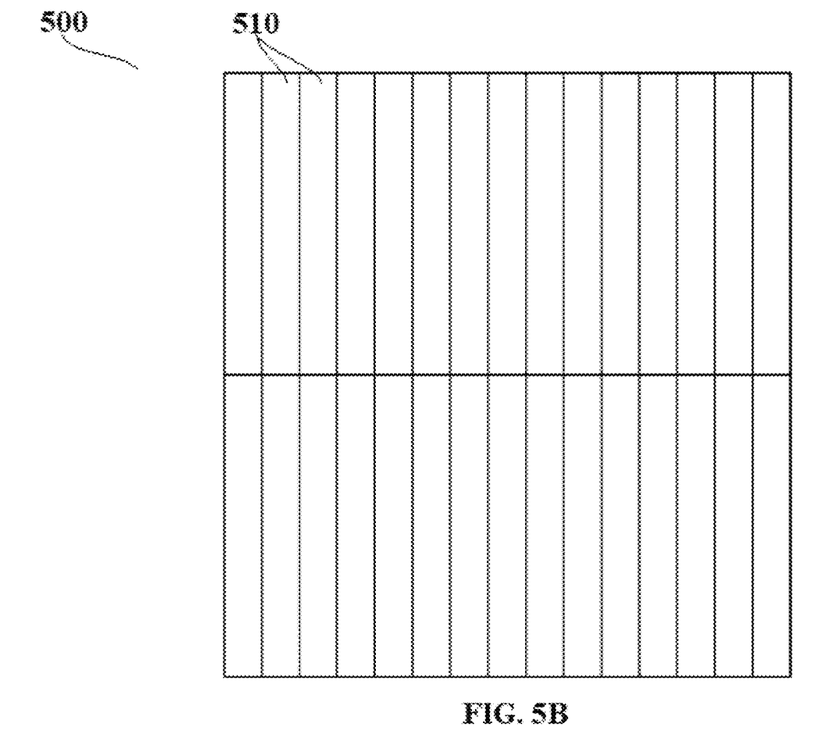
FIG. 5B shows one square embodiment of a battery unit made by arranging plurality of battery modules in two rows.

FIG. 5A and FIG. 5B show two different customized arrangement of the battery modules of battery unit 500, wherein the FIG. 5A shows a plurality of smaller battery modules 510 configure beside each other in a single row to form a rectangular embodiment of the battery unit 500 for rectangular enclosure body of the intelligent vehicle registration plate. While, FIG. 5B shows an another embodiment wherein the smaller battery modules 510 are configured in two rows forming a square battery unit 500 as some countries uses/issues square shaped vehicle registration plate for their vehicles. According to one embodiment, the battery modules 510 are made of a fire proof chemical material to avoid fire during puncture of battery unit 500 due to accidents and the operational temperature while the customization of battery allows it to fit in narrow spaces without compromising the required capacity.

Figure 6:
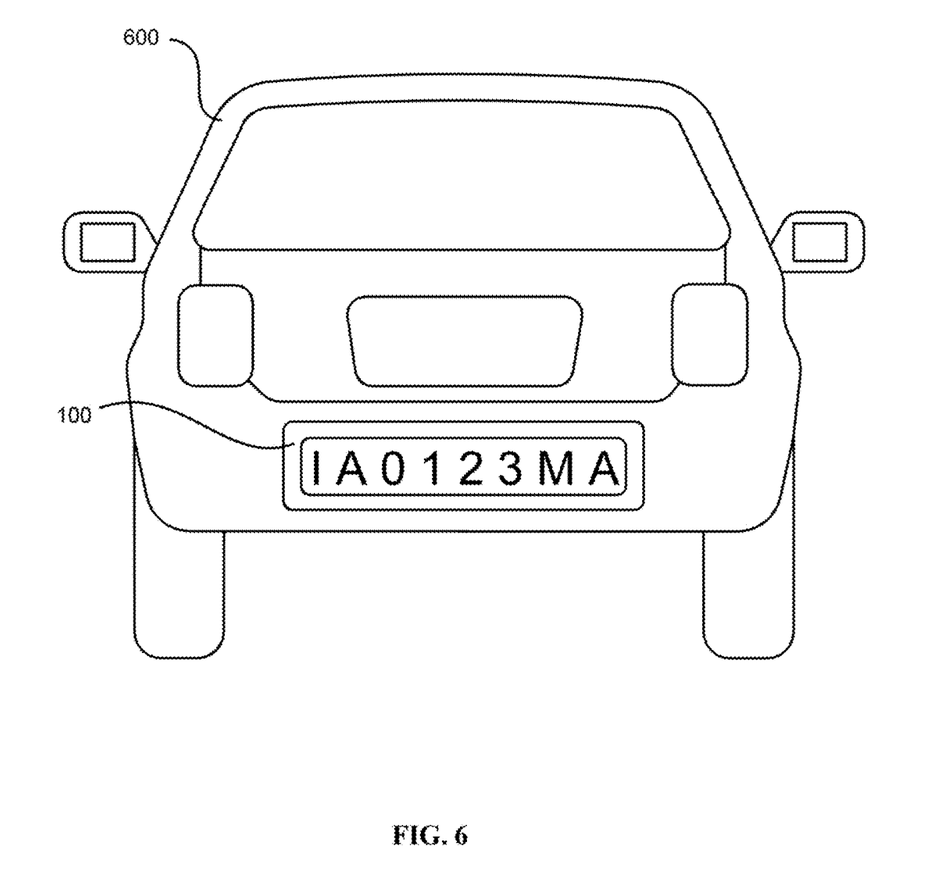
FIG. 6 shows view of an intelligent vehicle registration plate of present invention mounted on the first vehicle.

FIG. 6 shows an intelligent vehicle registration plate 100 of present invention mounted over the first vehicle 600 at the same location as the conventional metallic plate number by retrofitting said conventional metallic plate number over the enclosure body to form the intelligent vehicle registration plate 100. According to one embodiment, the enclosure body of the intelligent vehicle registration plate 100 is capable of being customized to conform the dimensions of the plate number as all the countries of the world does not follow the universal size of the number plates for vehicles, hence the invention provides a customizable enclosure body on which the conventional vehicle number plate may be mounted to convert it into an intelligent one.

The foregoing examples have been provided merely for the purpose of explanation and are in no way to be construed as limiting of the intelligent vehicle registration plate 100, disclosed herein. While the intelligent vehicle registration plate 100 has been described with reference to various embodiments, it is understood that the words, which have been used herein, are words of description and illustration, rather than words of limitation. Further, although the intelligent vehicle registration plate 100 has been described herein with reference to particular means, materials, and embodiments, the intelligent vehicle registration plate 100 is not intended to be limited to the particulars disclosed herein; rather, the intelligent vehicle registration plate 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the intelligent vehicle registration plate 100 disclosed herein in their aspects.

The invention claimed is:

1. An intelligent vehicle registration plate comprising:
a first enclosure compartment or cavity an enclosure body enclosing a smart electronic system of the intelligent vehicle registration plate;
a second enclosure compartment or cavity within the enclosure body enclosing a battery unit made of a plurality of smaller battery modules;
a top cover to secure a rare metal vehicle metallic registration plate over the enclosure body, wherein the metallic registration plate is fastened to the enclosure body;
a grommet button coupled with the smart electronic system and configured to respectively detect displacement of the metallic registration plate with respect to the enclosure body as well as displacement of the enclosure body with respect to a first vehicle on which the intelligent vehicle registration plate is mounted;
wherein the smart electronic system is further comprising:
a control unit made of a processor and a memory unit;
a plurality of various sensors configured to detect a one or more parameters of the first vehicle, generate and transmit a sensor data variable based on the detected one or more parameters;
a communication unit; and
a GPS module;
wherein the intelligent vehicle registration plate defines four different modes of operation to work in depending on the real time sensor data variables which includes a standby mode, normal mode, tracking mode and secure tracking mode;
wherein a separate status byte is defined by the processor for each of the four different modes which allows the analyzing module to identify the real time mode of operation of the intelligent vehicle registration plate and automatically shift to another mode after analyzing the real time sensor data variable; and
wherein the standby mode sends data once every first predetermined time interval duration, the normal mode sends data once every second predetermined time interval duration, the tracking mode sends data once every third predetermined time interval duration and the secure tracking mode sends data once every fourth predetermined time interval duration, wherein the first predetermined time interval duration is longer than the second, third and fourth predetermined time interval durations, the second predetermined time interval duration is longer than the third and fourth predetermined time interval durations, and the third time interval duration is longer than the fourth predetermined time interval duration;
wherein the control unit places the intelligent vehicle registration plate into the secure tracking mode upon receiving a call from the central server to call and track the location of the vehicle registration plate in real-time.

2. The intelligent vehicle registration plate of claim 1 is communicatively coupled with a central server using the communication unit.

3. The intelligent vehicle registration plate of claim 1, wherein a first cover is mounted over the first enclosure compartment to protect the smart electronic system.

4. The intelligent vehicle registration plate of claim 1, wherein a second cover is mounted over the second enclosure compartment to enclose the battery unit to prevent damage of any component of the smart electronic system if battery unit damages or leaks.

5. The intelligent vehicle registration plate of claim 4, wherein a gasket is provided on a corner border of the second enclosure compartment to properly seal the second cover over the second enclosing compartment.

6. The intelligent vehicle registration plate of claim 1, wherein the memory unit stores a first data set comprising a unique identifier database having a unique ID of the first vehicle verified by the central server and a set of a threshold sensor data variables associated with the first vehicle.

7. The intelligent vehicle registration plate of claim 6, wherein the sensor data variable of any of the plurality of various sensor exceeding the threshold sensor data variable stored within the memory unit is categorized as an event which further triggers an alert notification to the central server.

8. The intelligent vehicle registration plate of claim 7, wherein the communication unit is any of an LTE module or a GSM module which is configured to connect the intelligent vehicle registration plate with the central server to trigger the alert notification to the central server in cases of detection of the event.

9. The intelligent vehicle registration plate of claim 6, wherein the communication unit is further provided to allow the central server to call and track the location of the vehicle registration plate by dialing the unique ID of the first vehicle in case of detection of an event.

10. The intelligent vehicle registration plate of claim 1 further includes an analyzing module configured within the processor of the control unit to receive and analyze the sensor data variables to determine an event, predict a reason for said event and notifies the central server of said event with the reason, analyzed sensor data variable and real time location of the first vehicle.

11. The intelligent vehicle registration plate of claim 10, wherein the event is any of an accidents of the first vehicle, rollover of the first vehicle, accidental drifting by the first vehicle, drifting illegal donuts by the first vehicle, intelligent vehicle registration plate dismantling, removal or displacement of the first vehicle, metallic registration plate dismantling, removal or displacement from the enclosure body of the intelligent vehicle registration plate, over speeding and real time battery status of the intelligent vehicle registration plate.

12. The intelligent vehicle registration plate of claim 1, wherein the grommet button is coupled with the smart electronic system and configured extending out of the enclosure body through the first cover which sets between the enclosure body and the metallic registration plate.

13. The intelligent vehicle registration plate of claim 1, wherein the grommet button gets pressed by the metallic registration plate.

14. The intelligent vehicle registration plate of claim 1, wherein displacement of the metallic registration plate from the enclosure body because of any event including accident, turn over, dismantling, and theft causes the grommet button to extend out sending an emergency signal to the control unit of the smart electronic system which further notifies the event to the central server.

15. The intelligent vehicle registration plate of claim 14, wherein upon receiving a call from the control unit in response to the emergency signal, the control unit places the vehicle registration plate into the secure tracking mode.

16. The intelligent vehicle registration plate of claim 1, wherein the grommet button is coupled with the smart electronic system and configured extending out of the bottom surface of the enclosure body.

17. The intelligent vehicle registration plate of claim 1, wherein the grommet button is provided to detect and notify displacement of the intelligent vehicle registration plate from the first vehicle because of any event.

18. The intelligent vehicle registration plate of claim 1, wherein the processor of the intelligent vehicle registration plate prepares a battery status report and also notifies the central server in case of a battery unit of the intelligent vehicle registration plate drains below one specified level because of leakage or damage.

* * * * *